United States Patent
Wang et al.

(10) Patent No.: US 6,496,511 B1
(45) Date of Patent: Dec. 17, 2002

(54) METHOD FOR PRESERVING PREASSIGNED IP ADDRESSES IN A REMOTE ACCESS SERVER

(75) Inventors: Guanglu Wang, Buffalo Grove, IL (US); Jaideep Abichandani, Des Plaines, IL (US); Anthony Sasak, Mt. Prospect, IL (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/316,749

(22) Filed: May 21, 1999

(51) Int. Cl.$^7$ .................. H04L 12/28; G06F 15/177

(52) U.S. Cl. .................. 370/401; 370/465; 709/226; 709/228

(58) Field of Search ................... 370/401–405, 370/431, 437, 464, 465, 468, 475, 901, 902; 709/200, 220, 221, 222, 223, 226, 227, 228, 229, 250

(56) References Cited

U.S. PATENT DOCUMENTS 5,598,536 A * 1/1997 Slaughter, III et al.
6,282,193 B1 * 8/2001 Hluchyj et al.
6,393,482 B1 * 5/2002 Rai et al.
6,400,722 B1 * 6/2002 Chauh et al.

OTHER PUBLICATIONS

"Dynamic Host Configuration Protocol for Windows NT 5.0", <www.microsoft.com/ISN/whitepapers/p22667.asp>, Microsoft Corporation, 1998, pp. 1–23.
"MprAdminGetlpAddressForUser", <www.msdn.microsoft.com/library/psdk/rras/rasadmin_7dte.htm>,Microsoft Corporation, 2000, pp. 1–2.
"Routing and Remote Access Service for Windows NT Server: New Opportunities Today and Looking Ahead", <www.microsoft.com/TechNet/winnt/wuinntas/technote/rras.asp>, Oct., 1997, Microsoft Corporation, pp. 1–14.
"RAS Administration DLL", <www.msdn.microsoft.com/library/psdk/network/ras4over_5srw.htm>, 2000, Microsoft Corporation, pp. 1–2.
"RAS Administration DLL Registry Setup", <www.msdn/microsoft.com/library/psdk/networkras4over_6dkg.thm>, 2000, Microsoft Corporation, p. 1.
"RasAdminGetlpAddressForUser", <www.msdn.microsoft.com/library/psdk/network/rasadam_4xte.html >, 2000, Microsoft Corporation, pp. 1–2.
G. McGregor, The PPP Internet Protocol Control (IPCP), Network Working Group, RFC 1332, May, 1992, pp. 1 to 12.
R. Droms, Dynamic Host Configuration Protocol, Network Working Group, RFC 2131, Mar. 1997, pp. 1 to 40.

* cited by examiner

Primary Examiner—William A. Luther
(74) Attorney, Agent, or Firm—McDonnell, Boehnen Hulbert & Berghoff (57) ABSTRACT

A method is shown for splitting a static pool of Internet Protocol (IP) addresses in a Remote Access Server (RAS) of a network server device into a dynamically assignable pool and a fixed assignment pool. The IP addresses of the dynamically assignable pool are available to any remote client connecting to the network server. The IP fixed assignment pool contains IP addresses that have a predetermined assignment to specific remote clients. When a remote client connects to the network server, it requests assignment of an IP address from the RAS. If the remote client does not specify an IP address in its IP address request, then an IP address from the dynamically assignable pool is assigned to the remote client for the duration of its connection to the network server. If the remote client does specify an IP address in its IP address request, then the fixed assignment pool is searched for the requested IP address and the address is assigned to the remote client. The IP addresses of the fixed assignment pool are never assigned to a remote client that does not request a specific IP address.

27 Claims, 7 Drawing Sheets

METHOD FOR PRESERVING PREASSIGNED IP ADDRESSES IN A REMOTE ACCESS SERVER

FIELD OF INVENTION

The present invention relates to communications in computer networks. More specifically, it relates to the assignment of fixed Internet Protocol (IP) addresses by a Remote Access Server (RAS) of a network server device.

BACKGROUND OF THE INVENTION

The Internet, a world-wide-network of interconnected computers, provides multi-media content including audio, video, and graphics, that users can access through an Internet Service Provider (ISP).

In order to access the Internet, a user, or client, must be connected to a server that provides access to the Internet. The client can be connected to a local area network (LAN) having a network server with access to the Internet. Alternatively, the client is often located at a site that is remote from the server, in which case the user typically has a modem, such as a telephone or cable modem, connected to the user's customer premise equipment (CPE), such as a personal computer (PC). The modem is connected to a communications medium, such as the PSTN or cable system, through which the modem communicates with a modem termination system that is part of a dial-up server.

Figure 1:
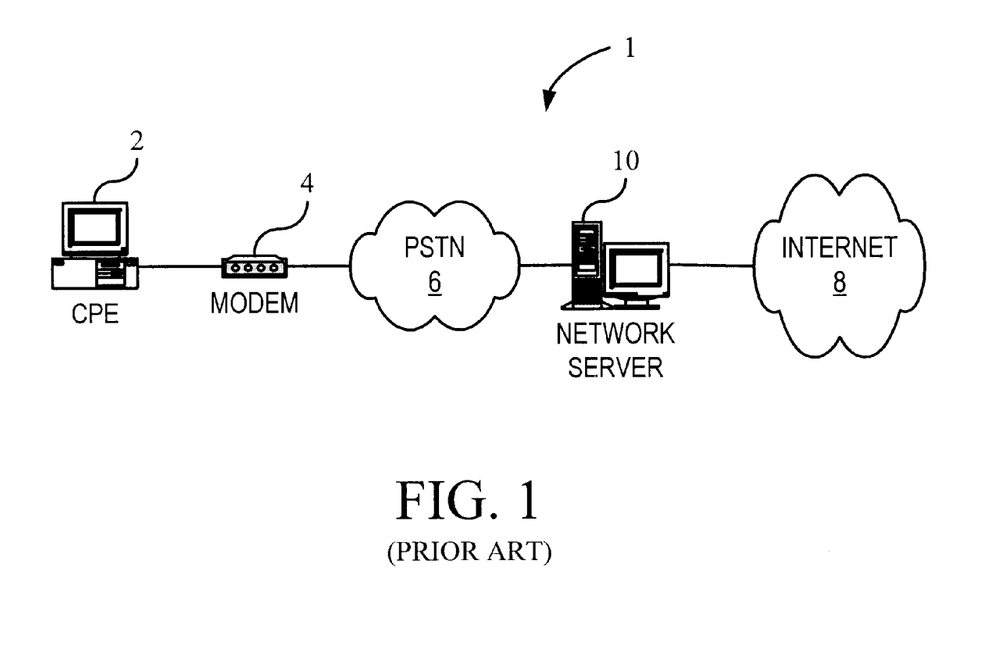
FIG. 1 is a block diagram illustrating an exemplary remote connection configuration.

An example of a dial-up connection configuration 1 is shown in FIG. 1. In the dial-up configuration 1, a CPE 2 is connected to modem 4 that is connected to public switched telephone network (PSTN) 6. Modem 4 communicates with a network server 10 through PSTN 6. The network server 10 is, in turn, connected to internet 8 and can send and receive IP network packets.

In order to perform data communications, CPE 2 sends data packets to modem 4, which sends the data packets upstream via the communications medium of the PSTN 6 to the modem termination system on network server 10. The network server 10 then sends the data packets to appropriate hosts on the internet data network 8. The network server 10 sends response data packets from these hosts back to the modem 4 attached to the user's CPE 2.

When a modem device initially connects to a network server, it must register with a remote access service (RAS) in the modem termination system in order to receive data over the communications connection and from a data network (e.g., the Internet or an Intranet). The modem forwards configuration information it receives in a configuration file during initialization to the modem termination system in the network server as part of a registration request message to the RAS. The modem also helps initialize and register any attached customer premise equipment with the modem termination system.

The modem termination system in the network server typically manages connections to multiple remote clients, such as CPE 2. Most of the modems are attached to host customer premise equipment, such as computers or internet telephony devices. In order to send and receive data packets to and from the Internet 8, the modem 4, CPE 2 and other network devices require an Internet Protocol ("IP") network address that is dynamically assigned by the RAS in the network server. The IP is an addressing protocol well known in the art, that is designed to route traffic within a network or between networks, i.e., the Internet 8.

Many RAS systems use a Dynamic Host Configuration Protocol ("DHCP") as a standard messaging protocol to dynamically allocate network addresses such as Internet Protocol ("IP") addresses. DHCP is a protocol for passing configuration information to network devices on a network and is well known in the art. DHCP is designed to negotiate with a computer newly connected to the network to automatically assign the computer an IP address. The IP address is typically randomly assigned from a pool of IP addresses reserved for the subnetwork to which the newly connected computer is attached or, if the newly connected computer requests a particular IP address, DHCP tries to assign the requested IP address to the computer. See the Internet Engineering Task Force (IETF) RFC 2131 for the DHCP. Information for IETF RFCs can be found on the World Wide Web at URLs "ds.internic.net" or www. ietf . org.

However, some network server devices, such as servers running the Windows NT operating system, by Microsoft Corporation of Redmond, Washington, can be configured to use a static IP address pool that is assigned by an RAS that does not have DHCP activated. In this case, the CPE 2 negotiates for an IP address using Internet Protocol Control Protocol ("IPCP"). The IPCP is defined in detail in RFC-1332, incorporated herein by reference. During IPCP negotiation, the CPE 2 negotiates an IP address with the RAS in network server 10. Within such a static IP address pool, it is often desirable that a particular IP address be assigned to a particular modem each time the modem initializes. For instance, if the modem serves an internet telephony device, such as a telephone or facsimile machine, having a particular IP address for the device can be advantageous. Also, it may be helpful to have the same IP address assigned to a remote printer device each time it connects to a network.

However, there is presently no mechanism for reserving a predetermined IP address in a fixed IP address pool for a particular user. Conventional network address servers will dynamically assign any IP address within the fixed pool, including a particular IP address needed by a particular user, to any user's modem in the course of a dynamic assignment algorithm. The particular user, when it attempts to initialize and obtain its predetermined IP address, may find that its predetermined IP address is in use by another user.

Therefore, the need remains for a method for reserving predetermined IP addresses within a fixed IP pool for the users to which they've been assigned.

SUMMARY OF THE INVENTION

In accordance with a preferred embodiment of the present invention, some of the problems associated with predetermined IP Addresses in network servers are overcome.

One aspect of the invention includes a method for reserving a predetermined Internet Protocol (IP) address in a remote access server (RAS) of a network server. The method involves providing a finite series of IP addresses having a first address and a last address in sequence and specifying a first fixed address that is intermediate to the first and last addresses, where a portion of the series of IP addresses from the first fixed address to the last address comprises a fixed IP address pool and a remaining portion of the series of IP addresses comprises a dynamic IP address pool, and where the fixed IP address pool includes the predetermined IP address. The method also calls for permitting a remote client that connects to the network server to request an IP address value in an IP address request to the RAS and receiving an IP address request from a remote client. The method then calls for searching only the dynamic IP address pool for an available IP address if the IP address value in the IP address request from the remote client is a predetermined value and, if an available IP address is found, assigning it to the remote client. Finally, the method sets forth searching only the fixed IP address pool for the IP address value in the IP address request from the remote client when the IP address value in the IP address request is not the predetermined value and, if the IP address value in the IP address request is found and is available, assigning the predetermined IP address to the remote client.

The foregoing and other features and advantages of a preferred embodiment of the present invention will be more readily apparent from the following detailed description, which proceeds with references to the accompanying drawings.

BRIEF DESCRIPTION OF THE DRAWINGS

Preferred embodiments of the present invention are described with reference to the following drawings, wherein.

DETAILED DESCRIPTION OF PREFERRED EMBODIMENTS

A Microsoft Windows NT based routing and remote access service (RAS) system in a network server can be configured to accept two types of IP address requests, a pre-determined IP request and a dynamic IP request. A pre-determined IP request can ensure that the user always has the same pre-determined value as IP address in the different RAS sessions. A dynamic IP request can have different values in different sessions.

However, there is no existing mechanism in the RAS system to prevent a pre-determined IP value from being assigned to a dynamic IP request. As a result, when a dynamic IP request is received, RAS assigns the first available IP address in its pool to the user. If this value happens to be a pre-determined IP address for another user, when this user tries to make a RAS connection, the attempt will rejected until this address is release from the first user.

The present invention is directed toward solving the problem of allocation of predetermined IP Addresses to remote clients to which the predetermined IP Addresses are not assigned. An embodiment of the present invention involves creation of a third party RAS administration DLL (AdminDll) and a corresponding configuration application. The AdminDll according to the present invention will allocate two separate IP pools for two different types of IP requests, respectively, and the configuration application allows a network administrator to determine how these two pools are allocated.

The Microsoft Windows NT RAS system provides a placeholder for a third party administration DLL. If RAS detects the existence of AdminDll, it will call a set of well-known functions provided by AdminDll during a RAS session. If there is no AdminDll, RAS will use its own default functions.

One of the functions related to this invention is called MprAdminGetIpAddressForUser( ). When RAS receives a RAS connection request from a remote user, it will call the MprAdminGetIpAddressForUser( ) function to get an IP address for this connection. This provides an opportunity for the AdminDll according to the present invention to determine what IP address will be used based upon the IP request type.

Because the preferred embodiment of the present invention is described in the context of a computer system operating as a network server having RAS capability and utilizing a Windows NT 4.0 operating system, the description below begins with a generalized discussion of the components of the computer system and the Windows NT operating system.

Figure 2:
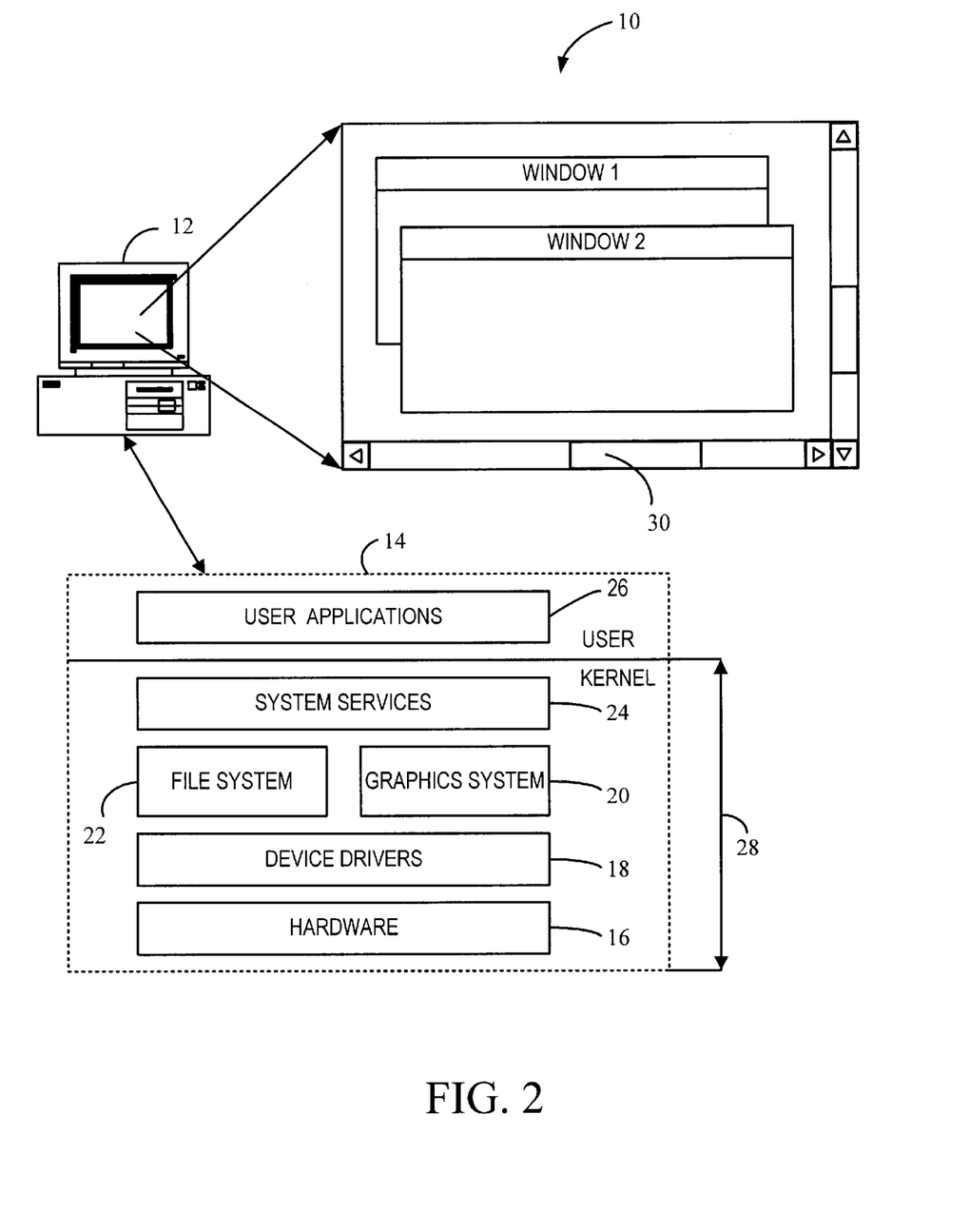
FIG. 2 is a block diagram illustrating an exemplary network server computing system.

FIG. 2 is a block diagram illustrating an exemplary computing system 10 suitable for use as a network server in a preferred embodiment of the present invention. The computing system 10 includes a computer 12 with a generic windowed operating system 14. The generic windowed operating system 14 generally includes a hardware layer 16, a device driver layer 18, a file system layer 22, a graphics system layer 20, a system services layer 24 and a user applications layer 26. The hardware layer 16, device driver layer 18, file system layer 22, graphics system layer 20, and system services layer 24 compose an operating system kernel 28. The generic windowed operating system 14 provides a Graphical User Interface ("GUI") 30 with multiple windows. However, more or fewer windowed operating system components could also be used and the present invention is not limited to the generic windowed operating system components illustrated in FIG. 2.

The hardware layer 16 is the actual hardware on the computer 12 such as monitor, keyboard, disk drive, etc. The device driver layers 18 is used to interact with actual hardware in the hardware layer 16. The file system layer 22 is used to create, save, retrieve and delete files. The graphic system layer 20 is used to create the GUI 30 with the multiple windows. The system services layer 24 is used to provide windowed operating system services. The user application layer 26 is used to provide user applications that interact with the windowed operating system kernel 28.

An operating environment for the computing system 10 for preferred embodiments of the present invention include a processing system with one or more high speed Central Processing Unit(s) ("CPU") and a memory. In accordance with the practices of persons skilled in the art of computer programming, the present invention is described below with reference to acts and symbolic representations of operations or instructions that are performed by the processing system, unless indicated otherwise. Such acts and operations or instructions are referred to as being "computer-executed" or "CPU executed."

It will be appreciated that acts and symbolically represented operations or instructions include the manipulation of electrical signals by the CPU. An electrical system represents data bits which cause a resulting transformation or reduction of the electrical signals, and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to the data bits.

The data bits may also be maintained on a computer readable medium including magnetic disks, optical disks, organic memory, and any other volatile (e.g., Random Access Memory ("RAM")) or non-volatile (e.g., Read-Only Memory ("ROM")) mass storage system readable by the CPU. The computer readable medium includes cooperating or interconnected computer readable medium, which exist exclusively on the processing system or be distributed among multiple interconnected processing systems that may be local or remote to the processing system.

In one exemplary preferred embodiment of the present invention, the network operating system is the Windows NT 4.0 operating system produced by the Microsoft Corporation of Redmond, Washington, which includes a routing and remote address server (RRAS). However, other network operating systems having RASs could also be used that assign IP addresses from a fixed pool that includes IP addresses that should be reserved for particular users and the present invention is not limited to the Microsoft Windows NT operating systems. For more information on the Windows NT operating system see "Beginning Windows NT Programming," by Julian Templeman, WROX Press Inc., Chicago, Ill., 1998, ISBN 1-861000-17-0, incorporated herein by reference.

Figure 3:
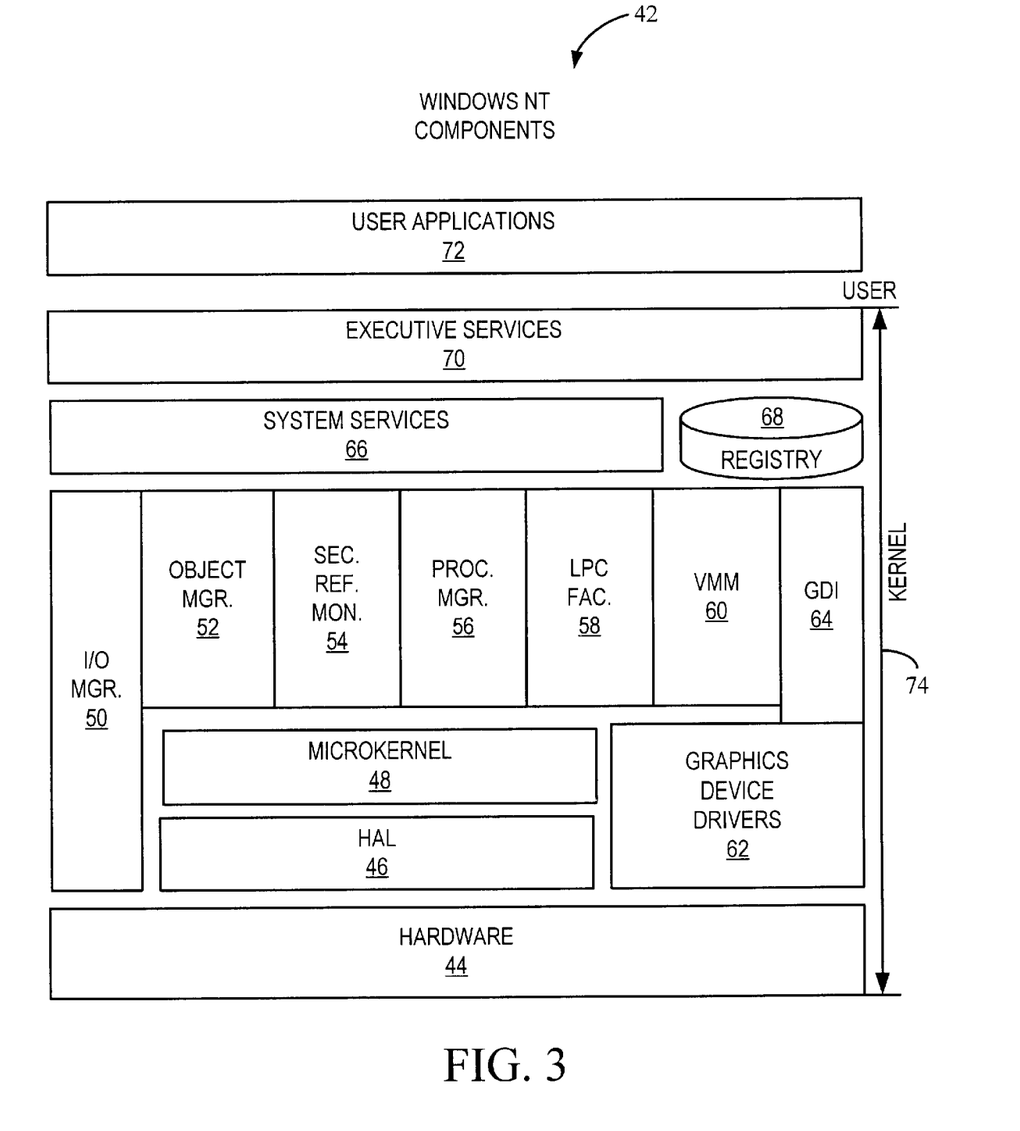
FIG. 3 is a block diagram illustrating exemplary Windows NT network operating system components.

FIG. 3 is a block diagram illustrating exemplary Windows NT operating system components 42. The Windows NT operating system 42 includes a Hardware layer 44, a Hardware Abstraction Layer ("HAL") 46, a Micro-kernel layer 48, an I/O Manager 50, an Object Manager 52, a Security Reference Monitor 54, a Process Manager 56, a Local Procedure Call ("LPC") facility 58, a Virtual Machine Manager ("VMM") 60, Graphics Device Drivers layer 62, a Graphical Device Interface ("GDI") 64, a System Services layer 66, an operating system Registry 68, an Executive Services layer 70, and User Applications layer 72. The operating system components below the User Applications layer 72 comprise an operating system kernel 74.

The Hardware layer 44 includes actual hardware on a computer (e.g., the computer 12 of FIG. 2). The HAL 46 comprises a library of hardware specific routines that sits between the hardware of computer 12 and the rest of the operating system. The HAL 46 provides standard entry points for access by higher-level functions. The Micro-kernel 48 is responsible for keeping the CPU(s) busy and efficient, scheduling threads, interrupts and exceptions, synchronizing activity between CPUs on multiprocessor machines, initiating system recovery after a power failure and other kernel tasks.

The I/O Manager 50 is responsible for managing input/output for the operating system. The Object Manager 52 is responsible for creating, managing and deleting operating system kernel objects. The Security Reference Monitor 54 provides operating system security information for the Object Manager 52. The Process Manager 56 (i) creates and destroys processes, (ii) is responsible for managing processes and threads, and (iii) provides a standard set of services for using processes and threads. The LPC facility 58 provides communications between applications and operating system services.

The VMM 60 is responsible for reading operating system pages and mapping the pages into process address space. The Graphics Device Drivers layer 62 is a layer of device drivers to provide graphics. The Graphical Device Interface ("GDI") 64 provides graphic services to create a multi-windowed GUI.

The System Services layer 66 provides an interface between the operating system kernel 74 and the User Applications layer 72. The operating system Registry 68 is a hierarchical database that stores hardware, software and user configuration settings for a computer (e.g., the computer 12). The Executive services layer 70 provides a common set of services that can be used by all components of the operating system. The User Applications layer 72 is used for running user applications.

This description of Windows NT components is intended to be for illustrative purposes only and is not intended to be a complete description of the components and details included in the Windows NT architecture. Additional information on the Windows NT operating system components can also be obtained on the Internet at the Uniform Resource Locator ("URL") "http://msdn. microsoft. com/developer/windowsnt."

Software applications, such as 32-bit applications (e.g., Win32) for windowed operating systems, such as Windows NT, by Microsoft Corporation of Redmond, Washington, execute as separate processes that execute within their own address space. The Windows NT operating system limits code that can execute within an address space to the code associated with a main executable module (e.g., ".EXE") and Dynamic Link Library ("DLL") modules loaded by a process associated with the main executable module.

As is known in the art, a Dynamic Link Library ("DLL") provides a mechanism for linking applications to libraries of functions at run-time. These libraries are "dynamically linked" because they are linked to an application when it is loaded and executed rather than when it is linked. When an application uses a DLL, the operating system loads the DLL into memory, resolves references to functions in the DLL so that they can be called by the application, and unloads the DLL when it is no longer needed. Loading a DLL into an address space results in execution of code within a DLL.

As is known in the art, an operating system registry stores hardware, software and user configuration settings for particular a computer. The AppInit_DLLs registry value can be used with Windows NT. A data value for the AppInit_DLLs registry value can contain a list of Dynamic Link Library module file names. When the Windows NT operating system module User Dynamic Link Library (e.g., USER32.DLL) is loaded into an address space, the user Dynamic Link Library will attempt to load the modules listed in this registry setting into a process address space. Use of the AppInit_DLLs registry value will inject a Dynamic Link Library in a process that executes code within a user's Dynamic Link Library (e.g., USER32.DLL).

Windows NT provides for an RAS Administration DLL ('AdminDLL') that permits installation of third party RAS code on a Windows NT network server. The AdminDLL provides a standard interface of functions that are exported so that the functions represent hooks for the introduction of RAS code. The network server can be configured to call these functions to provide RAS service whenever a user tries to connect or disconnect. Thus, the AdminDLL can be used to inject customized code for RAS functions into the Windows NT operating system of a network server.

A setup program for the third-party RAS administration DLL must register the DLL with RAS by providing information under the following key in the registry 68 of FIG. 3:

HKEY_LOCAL_
MACHINE\SOFTWARE\Microsoft\RAS\AdminDll.

To register the RAS AdminDLL, the following values must be set under the key above:

DisplayName, which contains a user-friendly display name for the DLL; and

DLLPath, which is the full path for the DLL.

As one example, DisplayName is "3Com ETSSG" and DLLPath is "%SystemRoot%\system32\etssgras.dll". These values must be set at the time of installation of the RAS code.

The Dynamic Link Library injection technique for RAS involves placing injection code within the AdminDLL file using the predefined names provided for by Routing and RAS (RRAS) for Windows NT 4.0. These function names are:

MprAdminAcceptNewConnection( );
MprAdminAcceptNewLink( );
MprAdminConnectionHangupNotification( );
MprAdminGetIpAddressForUser( );
MprAdminLinkHangupNotification( ); and
MprAdminReleaseIpAddress( ).

There are similar names provided through RAS for Windows NT 4.0, where the analogous functions begin with RasAdmin . . . ( ), such as RasAdminGetIpAddressForUser( ). See www.msdn.microsoft.com/library/sdkdoc/rras for additional information.

The AdminDLL scheme just described will permit RAS code for the present invention, which is discussed further below, to be invoked through the RAS services of the network server.

Figure 4:
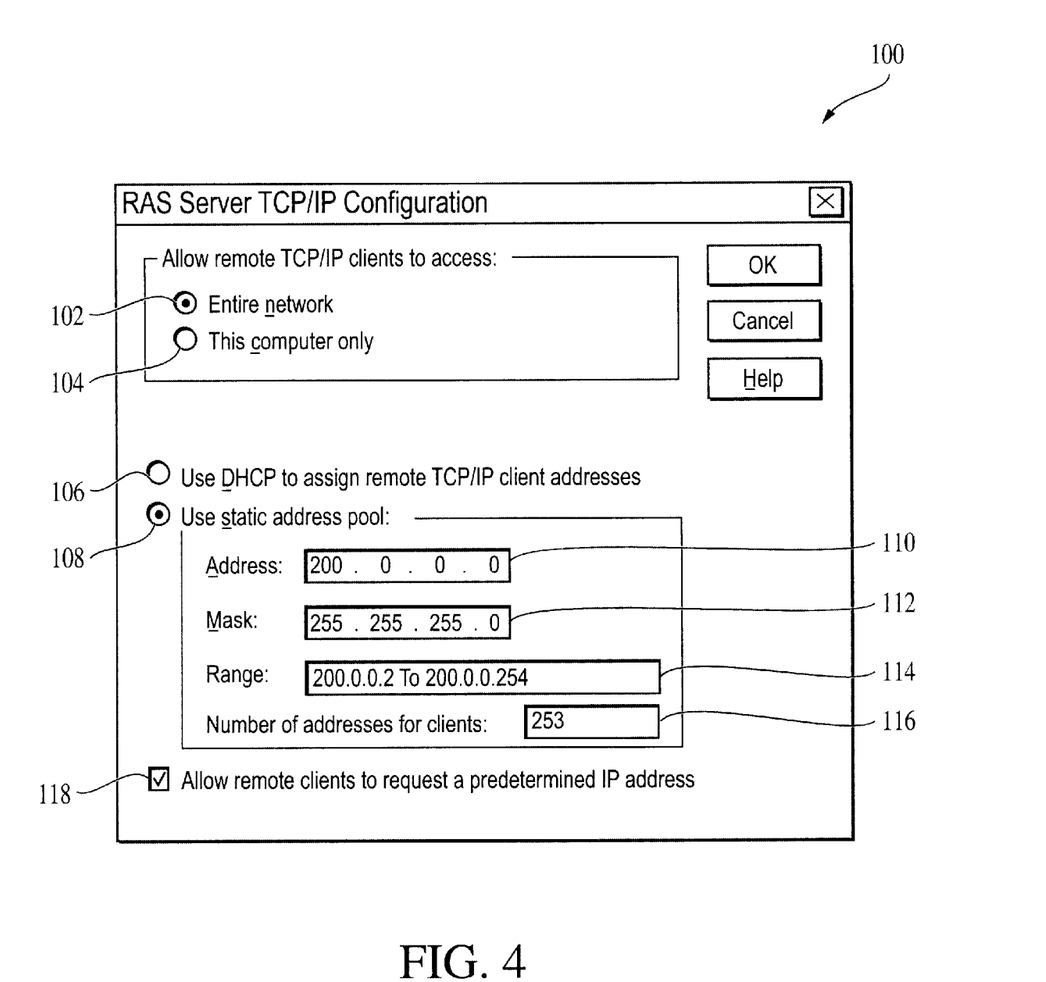
FIG. 4 is a diagram of a Windows NT RAS server TCP/IP Configuration screen.

A network server must be configured with certain information in advance in order to perform the RAS services according to the present invention. Windows NT includes an "RAS Server TCP/IP Configuration" screen that can be accessed using the graphical user interface of the operating system for the computer system of the network server 10 of FIG. 1. This screen configures the Remote Access Service (RAS) provided by the network server 10 and can be used to select the RAS service and to assign a static address pool. FIG. 4 illustrates an example of a "RAS Server TCP/IP Configuration" screen 100.

In screen 100, an "Entire Network" box 102 is selected that will cause the network server 10 to permit CPE 2 to access the IP network 8 through the network server. A "Use static address pool" box 108 is selected instead of "Use DHCP to assign remote TCP/IP client addresses" box 106. This selection determines the value of a field in registry 68. This field is HKEL_LOCAL_MACHINE\SOFTWARE\Microsoft\RAS\PROTOCOLS\IP\UseDHCPAddress ing. When DHCP box 106 is selected, this field is set to 0x1, which configures the network server to use DHCP. When box 108 is selected, this field is set to 0x0, which configures the network server 10 to use IPCP instead of DHCP to negotiate IP client addresses. When the field is 0x0, Windows NT operating system of the network server will also be triggered to access the AdminDLL in order to link the RAS code of the present invention.

When box 108 is selected, then the static address pool of IP addresses for the network server must be specified. By defining the start address of the pool in box 110 and the number of addresses in box 116, the range will be indicated in box 114. The value for the start address in box 110 is stored in registry 68 at:

HKEL_LOCAL_
MACHINE\SOFTWARE\Microsoft\RAS\PROTOCOLS\IP\IPAddress.

The value for the number of address in box 116 is stored in registry 68 at:

HKEL_LOCAL_
MACHINE\SOFTWARE\Microsoft\RAS\PROTOCOLS\IP\IPMask. The UseDHCPAddressing, IPAddress and IPMask fields are all existing fields within Windows NT.

The RAS configuration screen 100 also includes an "Allow remote clients to request a predetermined IP address" box 118. The value in box 118 is stored in registry 68 at HKEL_LOCAL_MACHINE\SOFTWARE\Microsoft\RAS\PROTOCOLS\IP\AllowClientIPAd dresses.

Selecting box 118 permits a remote client, such as CPE 2 or modem 4, to request a specific IP address from the network server 10 during IP address negotiation. Assigning a pre-determined IP address value to a particular remote client each time the client connects to the network can be useful. However, in existing network servers, the RAS is unable to prevent the pre-determined IP address for the server from being dynamically assigned to other remote clients through a typical assignment algorithm. As a consequence, when the particular remote client connects to the network server and requests the pre-determined IP address, the pre-determined IP address may be in use by another remote client and the connection request will fail.

The present invention is directed toward dividing the static IP address pool defined by the IPAddress and IPMask fields into a dynamic pool of IP addresses and a fixed pool of IP addresses. The dynamic pool of IP addresses can be assigned to any client according to the typical assignment algorithm. The fixed pool of IP addresses consists of separate pool of IP addresses that are reserved for specific remote clients and are not subject to assignment via the typical assignment algorithm.

In order to split the static IP address pool, the present invention requires that additional information be defined when the RAS service on the network server is configured. This information defines the start address for the fixed IP pool. The information is not in standard Windows NT data, but is in user defined data within registry 68. An example of a user defined field in registry 68 for use in an embodiment of the present invention is:

HKEL_LOCAL_
MACHINE\SOFTWARE\3Com\ETSSG\RASUserIPPool\FixedIPPoolStart.

The value for FixedIPPoolStart can be populated manually by a network administrator or through the use of a configuration screen that allows a user to define the boundaries of a fixed IP pool. An example of a configuration screen for an embodiment of the present invention is RAS User IP Pool configuration screen 120 illustrated in FIG. 5.

Figure 5:
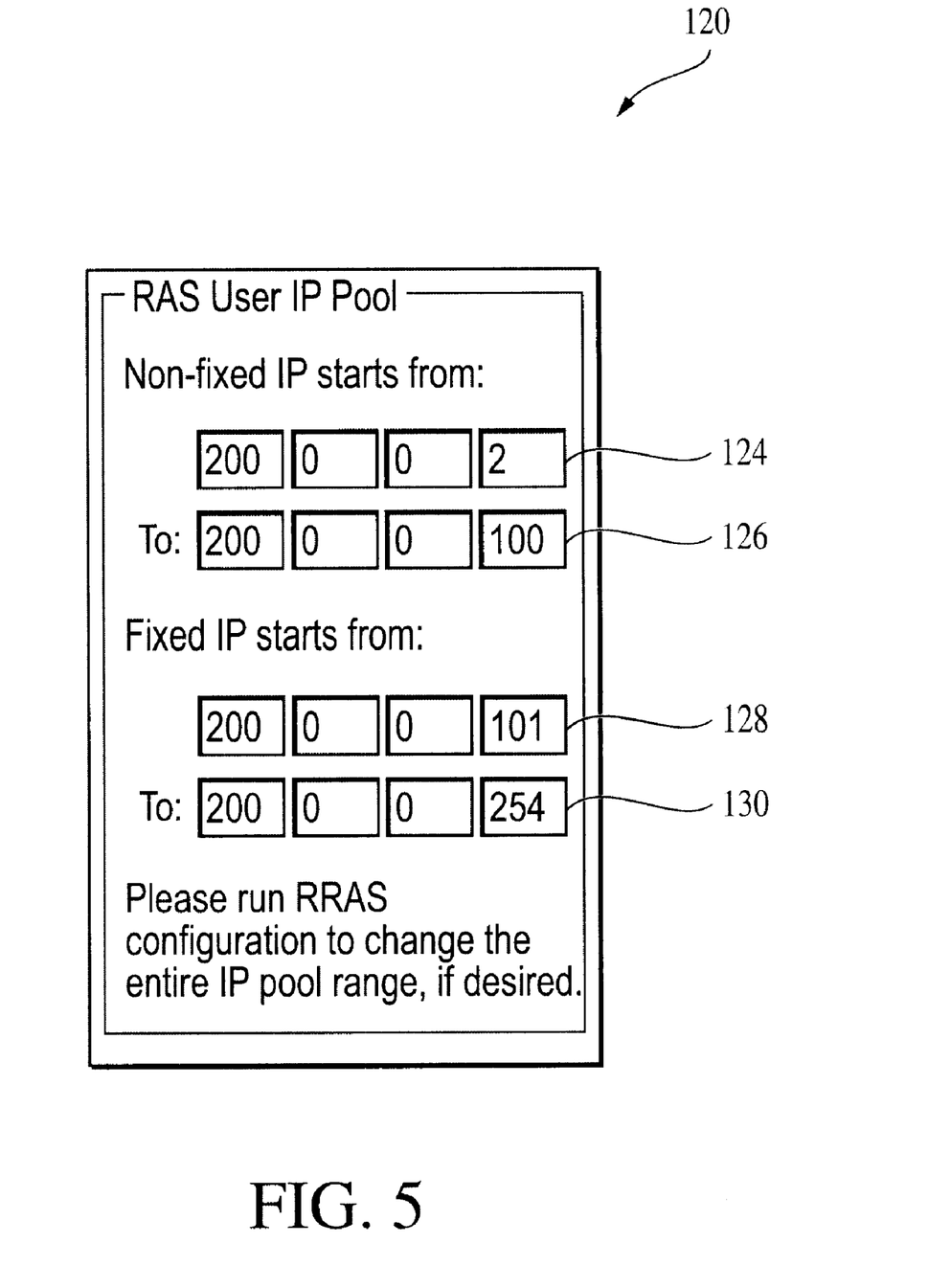
FIG. 5 is a diagram of an embodiment of a non-fixed and fixed pool configuration screen according to the present invention.

After the RAS server TCP/IP Configuration screen 100 is used to define the static EP address pool, screen 120 is executed in order to split the static IP address pool into the non-fixed dynamic IP address pool and the fixed IP address pool. In the embodiment of FIG. 5, Fixed IP start field 128 is defined by a user, such as a network administrator. The non-fixed IP start and end fields 124 and 126, respectively, and the fixed IP end field 130 can be automatically determined. Fixed IP start field 128 is used to populate the field FixedIPPoolStart in registry 68.

After screens 100 and 120 have been executed, the network server is configured with the data needed for the RAS service of the present invention. When a remote client requests a connection and IP address negotiation, the RAS service is invoked and the Windows NT operating system will dynamically link the RAS functional code indicated by the AdminDLL.

Figure 6:
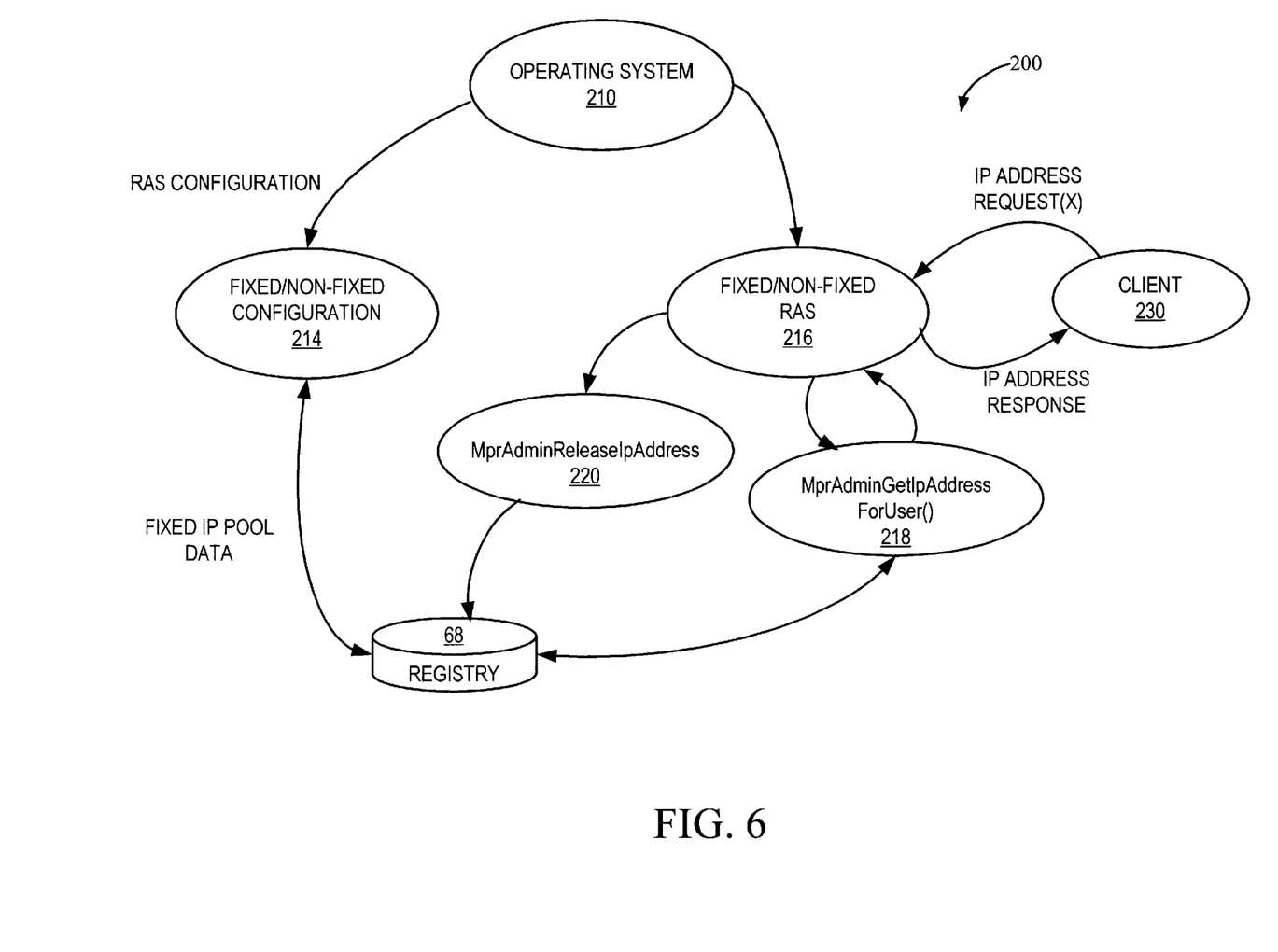
FIG. 6 is a data flow diagram illustrating the operation of an embodiment of a RAS service in a network server according to the present invention.

FIG. 6 is an abstract data flow diagram 200 illustrating an example of the message, control and data flow in an embodiment of the present invention. In the diagram 200, the operating system 210 has executed a fixed/non-fixed configuration process 214 that has populated registry 68 with the Fixed/Non-fixed IP Pool Data as described above with respect to screens 100 and 120 in FIGS. 4 and 5, respectively. At this point, the code for a fixed/non-fixed RAS process 216 dynamically linked by the operating system 210, using the code injection mechanism described above, is prepared to provide RAS IP address negotiation services to remote client process 230.

Client process 230, executing in a remote client such as CPE 2 or modem 4 of FIG. 1, initiates a connection with the network server 10 and establishes a point-to-point protocol (PPP) session with the network server. Client process 230 will send an IPCP message requesting an IP address. The IP address request from client process 230 will include an IP address value (X) that will be set to a pre-determined IP address if the client process 230 is requesting a particular IP address from the pool of fixed IP addresses. Otherwise, client process 230 will set the IP address value (X) to a binary 0.

RAS process 216 will respond to the IP Address Request (X) message from client process 230 by calling the MprAdminGetIpAddressForUser( ) function 218. When the connection between client process 230 and RAS 216 terminates, the RAS will call MprAdminReleaseIpAddress( ) function 220 with the IP address used by the client process 230. MprAdminReleaseIpAddress( ) function 220 will search both the dynamic and fixed pools of IP addresses for a record for the IP Address used by the client and will update the record to indicate that the IP address is available for assignment again.

Figure 7:
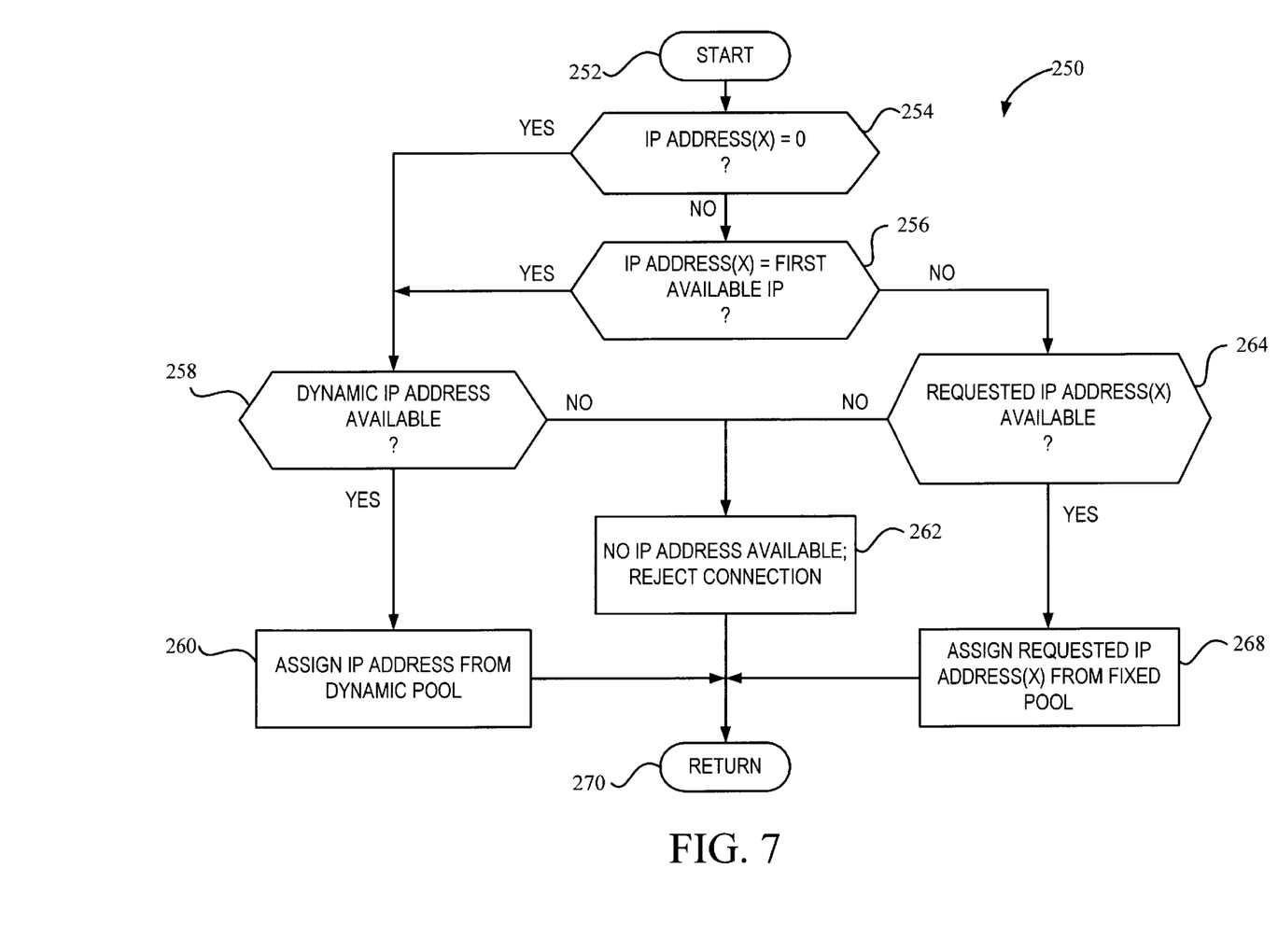
FIG. 7 is a flow diagram illustrating an embodiment of a MprAdminGetIpAddress ForUser( ) function according to the present invention.

FIG. 7 is a flow chart of the logic of control flow 250 for an embodiment of the MprAdminGetIpAddressForUser( ) function 218 according to the present invention. After entering the function, step 252, the IP Address(X) value is checked at step 254 to see if it is zero. If the IP Address(X) is 0, then the client process 230 is not requesting a predetermined IP address and an address from the dynamic IP address pool can be assigned to the client. Control flow then branches to step 258 where the function searches for an available IP address from the dynamic IP address pool. If an available dynamic IP address is found at step 258, then control flow proceeds to step 260 where the dynamic address found is assigned to the client process 230 for use for the duration of its session connection and the function returns success at step 270.

If no available IP address from the dynamic IP address pool is found at step 258, then control flow branches to step 262 where a return value is set to failure in order to reject the connection attempt by client process 230. The function then returns failure at step 270.

Returning to step 254, if IP Address(X) is non-zero, then control flow proceeds to step 256 where the function checks whether IP Address(X) is set to a predetermined First Available IP value that is used as a flag to perform dynamic IP address searching. Thus, if IP Address(X) is equal to the First Available IP value, then control branches to step 258 for a search for an available dynamic IP address.

Note here that the logic branch involving step 256 is included to account for the fact that the RAS process 216 will, in some circumstances, substitute the value of a First Available IP value in the pool of dynamic IP addresses for the 0 value sent by the client process 230 before calling MprAdminGetIpAddressForUser( ). A more elegant solution is possible where a zero value for IP Address(X) is the only predetermined flag value necessary for the search for an available dynamic IP address. However, the code leg of step 256 is necessary to accommodate the existing RAS infrastructure of Windows NT.

Returning to the test at step 254, if the IP Address(X) is non-zero and not equal to the First Available IP value, then this indicates that a pre-determined IP address has been requested by client process 230 and control flow branches to step 264. At step 264, the function checks whether the predetermined IP address is available.

Note that the predetermined IP address should be selected from the pool of fixed IP address values. Restriction of a particular IP address to a single remote client must be accomplished through network administration and maintenance. A separate mechanism and associated functionality, such as a table mapping for particular remote clients to particular fixed IP addresses, can be added to enforce fixed IP address assignments to remote clients.

If the predetermined IP address is available at step 264, then control flow branches to step 268 where the IP address is assigned to the client process 230 and the function returns success at step 270. If the predetermined IP address is unavailable at step 264, then control flow branches to step 262 to setup for failure return as described above.

Table 1 below contains pseudocode that illustrating an embodiment of the MprAdminGetIpAddressForUser( ) function according to the present invention.

TABLE 1

```
DWORD APIENTRY MprAdminGetIpAddressForUser(WCHAR *IpszUserName,
                                            WCHAR *IpszPortName,
                                            DWORD *pipAddress,
                                            BOOL *bNotifyRelease)
{
        if ( Initialization_done = FALSE)
        {
                Initialize_pre_determined_ip_pool( );
                Initialize_dynamic_ip_pool( );
                Initialization_done = TRUE;
        }
        default_ip_address = *pipAddress;
        if ( default_ip_address == 0)
        {
        /* RAS default IP address is zero, means user asks for a dynamic IP
address */
                *pipAddress = get_dynamic_ip_address( );
```

TABLE 1-continued

```
                if ( *pipAddress == 0)
                {
                /* dynamic IP pool is full, reject connection */
                        return ERROR;
                }
        }
        else if ( default_ip_address == get_first_available_ip_address( ))
        {
        /* RAS default IP address is the first available IP address, means users
                a dynamic IP address */
                *pipAddress = get_dynamic_ip_address( );
                if ( *pipAddress == 0)
                {
                /* dynamic IP pool is full, reject connection */
                        return ERROR;
                }
        }
        else
        {
        /* RAS default IP address is something else, means users asks for this
                specifically, assign this value to it and mark it as in use*/
        {
        *pipAddress = get_pre_determined_ip_address (default_ip_address);
        if ( *pipAddress == 0)
                {
                /* fixed IP address is unavailable, reject connection */
                        return ERROR;
                }
        }
        return SUCCESS;
}
```
(asks for / value annotations appear in the left margin)

In the pseudocode of Table 1, the function initially checks to see if initialization has been performed, i.e. Initialization_done=FALSE. If initialization has not been performed, the function calls Initialize_pre_determined_ip_pool( ) to initialize a linked list containing a record for each IP address in the fixed IP address pool. This function will go to the registry 68 of FIG. 3 to obtain the values from HKEL_LOCAL_MACHINE\SOFTWARE\Microsoft\RAS\PROTOCOLS\IP for IPAddress and IPmask in order to calculate the complete range of IP addresses in the static pool. This function will also go to the registry 68 to obtain the value from HKEL_LOCAL_MACHINE\SOFTWARE\3Com\ETSSG\RASUserIPPool\ v FixedIPPoolStart in order to determine where the fixed IP Address pool begins within the static IP Address pool. The function will then generate a record for each fixed IP address starting with FixedIPPoolStart and link it to the fixed IP address list.

After initializing the fixed IP Address list, MprAdminGetIpAddressForUser() function then calls Initialize_dynamic_ip_pool() to create another linked list containing a record for each IP address in the dynamic IP address pool. This function will also obtain IPAddress and FixedIPPoolStart from registry 68. Initialize_dynamic_ip_pool() will generate a record for each dynamic IP address starting with the address after IPAddress and halting at FixedIPPoolStart. It will also link each of the dynamic IP Address records to the dynamic IP address list. Thus, in this embodiment, IP Address is a reserved value that is used as a flag as discussed in further detail below.

The MprAdminGetIpAddressForUser() function then sets Initialization_done=TRUE so that initialization of the fixed and dynamic IP Address lists is not repeated. Note that each of the records in the list is initialized with a busy flag set to an available state, since none of the IP addresses should have been assigned to a remote client at this point.

Once initialization is complete or if it was previously completed, the function MprAdminGetIpAddressForUser() will set default_ip_address=*pipAddress. The pointer *pipAddress indicates the IP Address(X) included in the IP Address Request message from client process 230 to RAS process 216, as shown in FIG. 6.

As noted above with regard to the flow diagram of FIG. 7, if the First Available IP value is 0, a pre-determined value used as a flag, then a dynamic IP address is to be selected for the remote client. Thus, if default_ip_address==0, the function will call get_dynamic_ip_address( ) to obtain a dynamic IP address which will be placed in *pipAddress for return. The lower function get_dynamic_ip_address( ) will search the linked list for the dynamic IP address pool for a record that is not marked busy. If such an IP address is found, the record for the IP address is marked busy and the address is returned by get_dynamic_ip_address( ). If no dynamic IP address is available, i.e. all the record in the dynamic IP address list have their busy flag activated, then get_dynamic_ip_address() returns 0. MprAdminGetIpAddressForUser( ) will return ERROR if it detects a 0 return from get_dynamic_ip_address(). Otherwise, *pipAddress is setup to return an available IP Address.

If default_ip_address is non-zero, then it is checked to see if it is equal to the value for a first available dynamic IP address. This is another predetermined value that acts as a flag indicating that a dynamic IP address is requested for the client process 230. The function get_first_available_ip_address() will obtain the value for HKEL_LOCAL_MACHINE\SOFTWARE\Microsoft\RAS\PROTOCOLS\IP for IPAddress from registry 68 and return this value as the first available dynamic IP address. If default_ip_address matches the first available dynamic IP address, then get_dynamic_ip_address( ) is called to search for an available dynamic IP address as described above.

If default_ip_address is non-zero and not equal to the first available dynamic IP address, then this is interpreted by MprAdminGetIpAddressForUser( ) as a request for a specific IP address from the fixed IP address pool. In this case, get_pre_determined_ip_address( ) is called with default_ip_address. This function will search the fixed IP Address linked list for the record corresponding to the value of default_ip_address. If the record for the requested IP Address is found and its busy flag indicates that it is available, then the busy flag is marked as busy and get_pre_determined_ip_address( ) returns successfully. Otherwise, this function returns zero, which is used as a flag to indicate failure. Thus, if the fixed IP Address requested is unavailable or not part of the fixed IP pool, then ERROR is returned.

If none of the ERROR legs are encountered in Table 1, then MprAdminGetIpAddress-ForUser( ) returns SUCCESS and the pointer *pipAddress points to either an allocated dynamic IP Address or to an allocated fixed IPAddress.

When the PPP session between the client process 230, such as CPE 2 or modem 4 of FIG. 1, and the network server 10 disconnects, then the IP address assigned to the remote client must be released. The RAS process 216 is configured to call function MprAdmin ReleaseIpAddress( ) for the IP address assigned to the remote client in response to a disconnection event. This function will search both the dynamic and fixed lists for the record corresponding to the IP address and will change its busy flag to available so that the IP address is released and can be assigned again.

The RAS server according to the present invention permits a pool of fixed IP addresses to be segregated from a pool of static addresses and prevents these fixed IP addresses from being dynamically assigned to just any remote client. Thus, a predetermined IP address within the fixed IP address pool that is assigned to a specific remote client will be prevented from being assigned to other remote clients that do not request the predetermined IP address. The specific remote client can then request and be assigned the predetermined IP address during connection setup.

It should be understood that the programs, processes, methods, systems and apparatus described herein are not related or limited to any particular type of computer apparatus (hardware or software), unless indicated otherwise. Various types of general purpose or specialized computer apparatus may be used with or perform operations in accordance with the teachings described herein.

In view of the wide variety of embodiments to which the principles of the invention can be applied, it should be understood that the illustrated embodiments are exemplary only, and should not be taken as limiting the scope of the present invention. For example, the Steps of the flow diagram may be taken in sequences other than those described, and more or fewer elements or components may be used in the block diagrams. In addition, the present invention can be practiced with software, hardware, or a combination thereof.

The claims should not be read as limited to the described order or elements unless stated to that effect. Therefore, all embodiments that come within the scope and spirit of the following claims and equivalents thereto are claimed as the invention.

We claim:

1. A method for reserving a predetermined Internet Protocol (IP) address in a remote access server (RAS) of a network server, the method comprising the steps:

providing a finite series of IP addresses having a first address and a last address in sequence;

specifying a first fixed address that is intermediate to the first and last addresses, where a portion of the series of IP addresses from the first fixed address to the last address comprises a fixed IP address pool and a remaining portion of the series of IP addresses comprises a dynamic IP address pool, and where the fixed IP address pool includes the predetermined IP address;

permitting a remote client that connects to the network server to request an IP address value in an IP address request to the RAS;

receiving an IP address request from a remote client;

searching only the dynamic IP address pool for an available IP address if the IP address value in the IP address request from the remote client is a predetermined value and, if an available IP address is found, assigning it to the remote client; and searching only the fixed IP address pool for the IP address value in the IP address request from the remote client when the IP address value in the IP address request is not the predetermined value and, if the IP address value in the IP address request is found and is available, assigning the predetermined IP address to the remote client.

2. A computer readable medium having stored therein instructions for causing a central processing unit to execute the method of claim 1.

3. The method of claim 1, wherein:

the step of providing a finite series of IP addresses further comprises storing information regarding the series of IP addresses, including the first address of the series, in a database of the network server; and the step of specifying a first fixed address further comprises storing the first fixed address in the database of the network server.

4. The method of claim 3, where the RAS of the network server is part of a network operating system and the database of the network server is a registry within the network operating system.

5. The method of claim 4, where the network operating system is Windows NT.

6. The method of claim 5, where:

the step of storing information regarding the series of IP addresses, including the first address of the series, in a database of the network server further comprises:

storing the first address of the series at
HKEY_LOCAL_MACHINE\SOFTWARE\Microsoft\RAS\PROTOCOLS\IP\IPAddress, and storing a total number of the IP addresses in the series at
HKEY_LOCAL_MACHINE\SOFTWARE\Microsoft\RAS\PROTOCOLS\IP\IPMask;

the step of specifying a first fixed address that is intermediate to the first and last addresses includes storing the first fixed address in a user defined data portion of the registry of the Windows NT operating system.

7. The method of claim 6, where the step of specifying a first fixed address that is intermediate to the first and last addresses, where a portion of the series of IP addresses from the first fixed address to the last address comprises a fixed IP address pool and a remaining portion of the series of IP addresses comprises a dynamic IP address pool, and where the fixed IP address pool includes the predetermined IP address includes:

calculating the last address of the series of IP addresses using data stored at HKEY_LOCAL_MACHINE\SOFTWARE\Microsoft\RAS\PROTOCOLS\IP\IP Address and HKEY_LOCAL_MACHINE\SOFTWARE\Microsoft\RAS\PROTOCOLS\IP\IPMask, and generating a fixed IP address list containing a record for each IP address in the fixed IP address pool starting with the first fixed address stored in the user defined data portion of the registry and ending inclusively with the last address of the series of IP addresses, and generating a dynamic IP address list containing a record for each IP address in the dynamic IP address pool starting with the first address stored in HKEL_LOCAL_MACHINE\SOFTWARE\Microsoft\RAS\PROTOCOLS\IP\IPAddress and ending non-inclusively with the first fixed address stored in the user defined data portion of the registry, where each record in the fixed IP address list and the dynamic IP address list includes a busy flag initialized to an available value.

8. The method of claim 7, where the steps of searching only the dynamic IP address pool address if the IP address value in the IP address request from the remote client is a predetermined value and searching only the fixed IP address pool address if the IP address value in the IP address request is not the predetermined value are both incorporated into a MprAdminGetIpAddress ForUser( ) function predefined for the RAS in Windows NT and where:

the step of searching only the dynamic IP address pool address if the IP address value in the IP address request from the remote client is a predetermined value further comprises:

searching the dynamic IP address list to find an available record having its busy flag set to the available value, if the IP address value in the IP address request from the remote client is the predetermined value, returning an IP address value corresponding to the available record to the remote client if the available record is found and setting the busy flag of the available record to an unavailable value, and rejecting the IP address request from the remote client if the available record is not found; and the step of searching only the fixed IP address pool address if the IP address value in the IP address request is not the predetermined value further comprises:

searching the fixed IP address list to find a record corresponding to the IP address value in the IP address request, if the IP address value in the IP address request is not the predetermined value, returning a success indication to the remote client if the corresponding record is found and the busy flag of the corresponding record is set to the available value, and setting the busy flag of the corresponding record to the unavailable value, and rejecting the IP address request from the remote client if the corresponding record is not found and rejecting the IP address request from the remote client if the corresponding record is found and the busy flag of the corresponding record is set to the unavailable value.

9. The method of claim 8, where the step of receiving an IP address request from a remote client further comprises receiving an IPCP address request message that includes an IP address value.

10. The method of claim 9, where the predetermined value in the step of searching only the dynamic IP address pool for an available IP address if the IP address value in the IP address request from the remote client is a predetermined value further comprises one of a zero value and the first address in the series of IP addresses.

11. A computer readable medium having stored therein instructions for causing a central processing unit to execute the method of claim 10.

12. The method of claim 1, where:

the step of specifying a first fixed address that is intermediate to the first and last addresses includes:

generating a fixed IP address list containing a record for each IP address in the fixed IP address pool, and generating a dynamic IP address list containing a record for each IP address in the dynamic IP address pool, where each record in the fixed IP address list and the dynamic IP address list includes a busy flag initialized to an available value;

the step of searching only the dynamic IP address pool address if the IP address value in the IP address request from the remote client is a predetermined value further comprises:

searching the dynamic IP address list to find an available record having its busy flag set to the available value, if the IP address value in the IP address request from the remote client is the predetermined value, returning an IP address value corresponding to the available record to the remote client if the available record is found and setting the busy flag of the available record to an unavailable value, and rejecting the IP address request from the remote client if the available record is not found; and the step of searching only the fixed IP address pool address if the IP address value in the IP address request is not the predetermined value further comprises:

searching the fixed IP address list to find a record corresponding to the IP address value in the IP address request, if the IP address value in the IP address request is not the predetermined value, returning a success indication to the remote client if the corresponding record is found and the busy flag of the corresponding record is set to the available value, and setting the busy flag of the corresponding record to the unavailable value, and rejecting the IP address request from the remote client if the corresponding record is not found and rejecting the IP address request from the remote client if the corresponding record is found and the busy flag of the corresponding record is set to the unavailable value.

13. A computer readable medium, the medium having stored therein a code library configured for linkage to a network operating system in a network server, where the code library comprises remote access server (RAS) instruction code configured to:

obtain information from a first predetermined portion of a database of the network operating system that defines a finite series of IP addresses, the finite series of IP addresses having a first address and a last address in sequence;

obtain information from a second predetermined portion of the database of the network operating system that defines a start address for a fixed IP address pool within the finite series of IP addresses;

generate a dynamic IP address pool and a fixed IP address pool, where the fixed IP address pool includes a portion of the finite series of IP addresses from the start address to the last address in sequence and the dynamic IP address pool includes a remaining portion of the finite series of IP addresses;

search only the dynamic IP address pool for an available IP address responsive to receiving an IP address request message from a remote client having a predetermined value for a requested IP address value; and search the fixed IP address pool for the requested IP address value responsive to receiving the IP address request message from the remote client when the requested IP address value is not the predetermined value.

14. The code library of claim 13, where the library further includes configuration instruction code configured to prompt a user to define the start address for the fixed IP address pool within the finite series of IP addresses and store the start address in the second predetermined portion of the database of the network operating system.

15. The code library of claim 14, where the first predetermined portion of the database is predefined for the network operating system and the second predetermined portion of the database of the network operating system is a user defined portion of the database.

16. The code library of claim 13, where:

the code configured to generate a dynamic IP address pool and a fixed IP address pool is further configured to generate a linked list for the dynamic IP address pool that includes a record for each IP address in the dynamic IP address pool and a linked list for the fixed IP address pool that includes a record for each IP address in the fixed IP address pool, where each record includes a busy indicator that is initialized to an available value;

the code configured to search only the dynamic IP address pool for an available IP address is further configured to search the linked list for the dynamic IP address pool for one record having the busy indicator set to the available value and;

when the one record is found, set the busy indicator to an unavailable value and return an IP address corresponding to the one record to the remote client, and when the one record is not found, reject the IP address request message from the remote client; and the code configured to search the fixed IP address pool for the requested IP address value is further configured to search the linked list for the fixed IP address pool for a record corresponding to the requested IP address value from the remote client and;

when the record corresponding to the requested IP address value is found and the busy indicator for the corresponding record is set to the available value, set the busy indicator for the corresponding record to the unavailable and accept the IP address request message from the remote client, and when one of the record corresponding to the requested IP address value is not found and the record corresponding to the requested IP address value is found but the busy indicator for the corresponding record is set to the unavailable value, reject the IP address request message from the remote client.

17. The code library of claim 16, where the code library further includes RAS instruction code configured to release the IP address value for the remote client responsive to termination of a connection of the remote client to the network server, where the lists for both the dynamic and fixed IP address pools are searched for the record corresponding to the IP address value for the remote client and the busy indicator of the record corresponding to the IP address value for the remote client is set to the available state.

18. The code library of claim 17, wherein:

the network operating system further comprises Windows NT;

the code library further comprises an AdminDLL of Windows NT;

the code configured to search only the dynamic IP address pool for an available IP address and the code configured to search the fixed IP address pool for the requested IP address value further comprise a MprAdminGetIpAddressForUser( ) function; and the code configured to release the IP address value for the remote client further comprises a MprAdminReleaseIpAddress( ) function.

19. The code library of claim 18, wherein the code configured to obtain information from a first predetermined portion of a database of the network operating system that defines a finite series of IP addresses, the code configured to obtain information from a second predetermined portion of the database of the network operating system that defines a start address for a fixed IP address pool within the finite series of IP addresses, and the code configured to generate a dynamic IP address pool and a fixed IP address pool, is further included in the MprAdminGetIpAddressForUser( ) function.

20. The code library of claim 19, where:

the first predetermined portion of the database of the network operating system includes HKEY_LOCAL_MACHINE\SOFTWARE\Microsoft\RAS\PROTOCOLS\IP\IPAddress and HKEY_LOCAL_MACHINE\SOFTWARE\Microsoft\RAS\PROTOCOLS\IP\IPMask; and the second predetermined portion of the database of the network operating system is a user defined portion under HKEL_LOCAL_MACHINE\SOFTWARE.

21. A network server system for providing remote access to a remote client, the network server system comprising:

a computer system having a termination system for communicating with the remote client; and a network operating system having:

a database configured to store information in a first portion of the database that defines a finite series of IP addresses having a first address and a last address in sequence and store information in a second portion of the database that defines a first address of a fixed IP address pool, and a remote access server (RAS), the RAS being configured to:

divide the finite series of IP addresses into a fixed IP address pool, which includes a portion of the finite series of IP addresses from the start address to the last address in sequence, and a dynamic IP address pool, which includes a remaining portion of the finite series of IP addresses;

receive an IP address request message from the remote client through the termination system;

allow the remote client to request an IP address value in the IP address request message from the client;

search only the dynamic IP address pool for an available IP address responsive to the IP address value in the IP address request message from a remote client being a predetermined value; and search the fixed IP address pool for the IP address value responsive to the IP address value in the IP address request message not being the predetermined value.

22. The network server system of claim 21, where the RAS is further configured to:

divide the finite series of IP addresses into a fixed IP address pool by generating a linked list for the dynamic IP address pool that includes a record for each IP address in the dynamic IP address pool and a linked list for the fixed IP address pool that includes a record for each IP address in the fixed IP address pool, where each record includes a busy indicator that is initialized to an available value;

search only the dynamic IP address pool for an available IP address by searching the linked list for the dynamic IP address pool for one record having the busy indicator set to the available value and:

when the one record is found, set the busy indicator to an unavailable value and return an IP address corresponding to the one record to the remote client, and when the one record is not found, reject the IP address request message from the remote client; and search the fixed IP address pool for the requested IP address value by searching the linked list for the fixed IP address pool for a record corresponding to the IP address value from the remote client and:

when the record corresponding to the requested IP address value is found and the busy indicator for the corresponding record is set to the available value, set the busy indicator for the corresponding record to the unavailable and accept the IP address request message from the remote client, and when one of the record corresponding to the requested IP address value is not found and the record corresponding to the requested IP address value is found but the busy indicator for the corresponding record is set to the unavailable value, reject the IP address request message from the remote client.

23. The network server system of claim 22, where the RAS is further configured to release the IP address used by the remote client responsive to termination of a connection between the network server and the remote client by searching the fixed and dynamic linked lists for a record corresponding to the IP address used by the remote client and setting the busy indicator to the available value.

24. The network server system of claim 23, where the network operating system further comprises Windows NT and the database is a registry within Windows NT, wherein the first portion of the database that defines the finite series of IP addresses is a portion of the registry at:

HKEY_LOCAL_MACHINE\SOFTWARE\Microsoft\RAS\PROTOCOLS\IP\IPAddress and

HKEY_LOCAL_MACHINE\SOFTWARE\Microsoft\RAS\PROTOCOLS\IP\IPMask; and the second portion of the database of the network operating system is a user defined portion of the registry under HKEY_LOCAL_MACHINE\SOFTWARE.

25. The network server system of claim 24, where the RAS is further configured to search only the dynamic IP address pool and search the fixed IP pool within a MprAdminGetIp AddressForUser( ) function predefined by Windows NT.

26. The network server system of claim 25, where the RAS is further configured to release the IP address used by the remote client within a MprAdminReleaseIpAddress( ) function predefined by Windows NT.

27. The network server system of claim 21, where the RAS is further configured to prompt a user to define the start address for the fixed IP address pool within the finite series of IP addresses and store the start address in the second predetermined portion of the database of the network operating system.

* * * * *